United States Patent
González Andrade et al.

(10) Patent No.: US 11,360,261 B2
(45) Date of Patent: Jun. 14, 2022

(54) INTEGRATED MODE CONVERTER AND MULTIPLEXER

(71) Applicants: CONSEJO SUPERIOR DE INVESTIGACIONES CIENTÍFICAS (CSIC), Madrid (ES); UNIVERSIDAD DE MÁLAGA, Málaga (ES)

(72) Inventors: David González Andrade, Madrid (ES); Aitor Villafranca Velasco, Madrid (ES); Pedro Corredera Guilén, Madrid (ES); J. Gonzalo Wangüemert Pérez, Málaga (ES); Alejandro Ortega Moñux, Málaga (ES); Robert Halir, Málaga (ES); Iñigo Molina Fernández, Málaga (ES)

(73) Assignee: CONSEJO SUPERIOR DE INVESTIGACIONES CIENTIFICAS (CSIC), Madrid (ES)

( * ) Notice: Subject to any disclaimer, the term of this patent is extended or adjusted under 35 U.S.C. 154(b) by 79 days.

(21) Appl. No.: 16/650,449

(22) PCT Filed: Sep. 24, 2018

(86) PCT No.: PCT/EP2018/075753
§ 371 (c)(1),
(2) Date: Mar. 25, 2020

(87) PCT Pub. No.: WO2019/063464
PCT Pub. Date: Apr. 4, 2019

(65) Prior Publication Data
US 2020/0225412 A1 Jul. 16, 2020

(30) Foreign Application Priority Data

Sep. 29, 2017 (ES) .............................. ES201731166

(51) Int. Cl.
G02B 6/12 (2006.01)
G02B 6/124 (2006.01)
(Continued)

(52) U.S. Cl.
CPC ......... *G02B 6/12004* (2013.01); *G02B 6/124* (2013.01); *G02B 6/125* (2013.01);
(Continued)

(58) Field of Classification Search
None
See application file for complete search history.

(56) References Cited

U.S. PATENT DOCUMENTS

2014/0126855 A1  5/2014  Onishi

FOREIGN PATENT DOCUMENTS

EP  2889672 A1  7/2015
ES  2379058 A1 * 4/2012 ........... G02B 6/2813

OTHER PUBLICATIONS

Halir et al. ("Waveguide Sub-wavelength Structures; A Review of Principles and Applications", Laser & Photonics Reviews, Sep. 30, 2014, vol. 9, No. 1, pp. 25-49) (Year: 2014).*

(Continued)

*Primary Examiner* — Michelle R Connelly
(74) *Attorney, Agent, or Firm* — Hayes Soloway P.C.

(57) ABSTRACT

An integrated mode converter and multiplexer (/demultiplexer) is disclosed, which combines a multimode interference coupler (100), at least one phase-shifter (200) and a symmetrical Y-junction (300). The dispersion of the multimode interference coupler (100) is engineered through sub-wavelength structures in order to achieve a very wide bandwidth. Several phase-shifter (200) topologies for further bandwidth enhancement are disclosed, as well as architectures for multiplexing a greater number of optical modes.

9 Claims, 8 Drawing Sheets

(51) Int. Cl.
G02B 6/125 (2006.01)
G02B 6/14 (2006.01)
G02F 1/21 (2006.01)
G02F 1/225 (2006.01)
G02B 6/28 (2006.01)
G02B 6/34 (2006.01)
G02F 1/01 (2006.01)
G02B 6/122 (2006.01)

(52) U.S. Cl.
CPC ........... *G02B 6/12007* (2013.01); *G02B 6/14* (2013.01); *G02B 6/2813* (2013.01); *G02B 6/34* (2013.01); *G02F 1/011* (2013.01); *G02F 1/217* (2021.01); *G02F 1/225* (2013.01); *G02B 6/1228* (2013.01); *G02B 2006/1209* (2013.01); *G02B 2006/12088* (2013.01); *G02B 2006/12152* (2013.01); *G02B 2006/12164* (2013.01)

(56) References Cited

OTHER PUBLICATIONS

Yaming Li et al. ("Compact Two-Mode (De)multiplexer Based on Symmetric Y-junction and Multimode Interference Waveguides", Optics Express, Mar. 5, 2014, vol. 22, No. 5, pp. 1-7) (Year: 2014).*
Hali et al. (Machine Translation of description of EP 2 379 058, published Apr. 20, 2012.) (Year: 2012).*
Yaming Li, "Compact Two-Mode (De)Multiplexer Based on Symmetric Y-Junction and Multimode Interference Waveguides", Journal, Mar. 5, 2014, 1-7, vol. 22, No. 5, Optics Express.
A. Maese-Novo, "Wavelength Independent Multimode Interference Coupler", Journal, Mar. 13, 2013, 1-8, vol. 21, No. 6, Optics Express.
Junjia Wang, "Subwavelength Grating Enabled On-Chip Ultra-Compact Optical True Time Delay Line", Jul. 26, 2016, 1-10, vol. 6, No. 1, Scientific Reports.
Fei Guo, "A Two-Mode (De)Multiplexer Based on Multimode Interferometer Coupler and Y-Junction on InP Substrate", Journal, Feb. 2016, 1-9, vol. 8, No. 1, IEEE Photonics Journal, IEEE Photonics Society.
Robert Halir, "Waveguide Sub-Wavelength Structures: A Review of Principles and Applications", Article, Sep. 30, 2014, 25-49, vol. 9, No. 1, Laser & Photonics Reviews.

* cited by examiner

INTEGRATED MODE CONVERTER AND MULTIPLEXER

CROSS-REFERENCE TO RELATED APPLICATIONS AND PRIORITY

This patent application claims priority from PCT Patent Application No. PCT/EP2018/075753 filed Sep. 24, 2018, which claims priority from Spanish Patent Application No. ESP201731166 filed Sep. 29, 2017. Each of these patent applications are herein incorporated by reference in its/their entirety.

FIELD OF THE INVENTION

The present invention has its application within the photonics sector and, especially, in the industrial area engaged in providing waveguide-based mode converter and multiplexers.

BACKGROUND OF THE INVENTION—RELATED ART

High-capacity photonic interconnects are highly sought-after in order to exceed the capacity limits imposed by traditional copper interconnects. Some advantages of photonic interconnects are lower power consumption, circumvention of parasitic capacitance and compatibility with a plurality of multiplexing techniques to increase the overall aggregated bandwidth. For example, wavelength division multiplexing (WDM), polarization division multiplexing (PDM) and space division multiplexing (SDM) schemes can be combined to scale up the data-transmission capacity of the devices, in an attempt to cover the steadily growing demand of new services handling data volumes.

All these techniques can be combined with mode division multiplexing (MDM) for even further aggregated bandwidth increase. MDM enables the transmission and reception of several spatial encoded modes through a multimode waveguide, where each eigenmode is exploited as an independent data channel. In a MDM converter and multiplexer (MUX), each of a plurality of monomode input waveguides receives a channel encoded in the same zero-order optical mode. The MUX converts each input zero-order optical mode into a different-order output optical mode, and merges all of them into the same output multimode waveguide. For example, a MDM MUX may receive three signals sharing a TE0 mode (that is, a zero-order transverse electric mode) through separate waveguides, and converter the three signals into TE0, TE1 (first-order transverse electric mode) and TE2 (second-order transverse electric mode), respectively, sharing the same output waveguide.

Notice that a MDM multiplexer can operate as a de-multiplexer (DEMUX) without any structural change by simply inverting inputs and outputs. That is, the same device can operate as DEMUX by using the multimode waveguide as input for a mode-multiplexed signal combining different-order modes. Each mode is then separated, converted to zero-order modes, and transmitted through separate monomode waveguides. Therefore, when multiplexers are mentioned in the present document, it should be understood as encompassing both multiplexers and de-multiplexers.

Different architectures have been proposed to perform mode conversion and multiplexing, including asymmetrical directional couplers (ADC), ring resonators (RR), adiabatic and counter-tapered couplers, and asymmetrical y-junctions. However, ADC and RR are inherent narrowband devices, whereas other coupling-based solutions require long propagation lengths as they rely on mode-evolution. Depending on their particular implementation, asymmetrical y-junctions either require long propagation lengths, or are very sensitive to fabrication deviations from the ideal design. That is, a small variation in the fabricated waveguide width compared to its nominal value, inevitable when mass-producing the photonic interconnects, results in significant performance degradation.

Alternatively, MDM MUX devices based on multimode interference couplers (MMI) have been proposed, typically in combination with phase-shifters. A MMI is a photonic device with a variable number of input and outputs, which comprises a multimode slab where self-images of the input signals are generated at given propagation lengths. By appropriately designing the slab properties and the propagation length at which the outputs are located, power-splitting capabilities are enabled. For example, US 2014/0126855 A1 presents a mode converter (without multiplexing capabilities), in which an input signal is equally split into a plurality of inputs of a MMI with multiple inputs and a single output. By combining individual phase-shifters at each MMI input and an adiabatic waveguide width transition at the input, several mode transformations can be achieved. Nevertheless, MMI-based solutions are limited by the MMI excess losses and dispersion profile, ultimately limiting bandwidth improvement.

There is hence still the need of waveguide-based devices which integrate mode conversion and multiplexing, and which are capable of operating in a very broad bandwidth. It is also desirable that the multiplexers present a compact footprint and a high tolerance to fabrication deviations from the nominal design.

SUMMARY OF THE INVENTION

The current invention solves the aforementioned problems by disclosing a MMI-based mode conversion and multiplexing architecture with greatly enhanced bandwidth by means of sub-wavelength engineering. The mode converter and multiplexer of the invention presents at least two monomode input waveguides, which receive zero-order signals (for example, signals encoded in TE0 modes), and a single multimode output waveguide, which transmits at least two output signals encoded in different-order signals (for example, a first signal encoded in TE0 mode and a second signal encoded in TE1 mode). The conversion and multiplexing of the input modes into the output modes is performed by the synergic combination of three elements, namely a subwavelength multimode interference coupler, at least one phase-shifter and at least a symmetrical y-junction.

The multimode interference coupler comprises at least two inputs and two outputs. At least a first input waveguide of the MUX device is connected to the first input of the MMI, and a second input waveguide of the MUX device is connected to the second input of the MMI. Depending on the particular implementation, said connections between input waveguides and MMI inputs may be performed through additional elements such as phase-shifters, couplers, etc, as further detailed in the detailed description of preferred embodiments. Likewise, all MMI outputs are then combined into the output multimode waveguide through at least one phase-shifter and at least one Y-junction. Again, notice that any input/output terminology is used to facilitate understanding of the operation principle, but doesn't intend to limit the device to MUX operation, as the same disclosed device may be used as DEMUX by straightforwardly using inputs as outputs and vice versa.

The MMI is configured as a balanced power splitter, equally dividing signals received through any input into the multiple outputs. This is typically implemented by means of a N×N MMI, that is, an MMI with the same number of inputs and outputs, where each input is aligned with an output. Notice that, in the process, phase shifts are induced between the outputs. In the case of a 2×2 MMI (that is, an MMI with two inputs and two outputs), a 90° phase shift is induced between outputs.

In order to increase the operational bandwidth, the MMI comprises at least one subwavelength (SWG) region, that is, a region comprising periodically alternating sections of a core material and of a cladding material, with a period smaller than a shortest wavelength within a bandwidth of the mode converter and multiplexer bandwidth. Subwavelength structures suppress diffraction effects while implementing a metamaterial with an effective index comprised between the core and cladding indices. The effective index of this metamaterial can be selected by changing fill factor or duty cycle (that is, the proportion of each material within a period).

Preferably, the SWG region of the MMI is dispersion engineered to maximize bandwidth. That is, one or more parameters of the SWG are chosen through photonic simulations which optimize the bandwidth and/or flatness of the SWG spectral response. Said parameters may include one or more of the following: period, fill factor, slab width and slab height.

Also preferably, the SWG region covers all the MMI, and the aforementioned SWG design parameters remain constant along all the region. Nevertheless, other particular implementations of the MMI may comprise areas both with and without SWG, areas with different SWG parameters, and/or areas with varying SWG parameters.

More preferably, the MMI may comprise SWG mode adapters at its inputs and/or outputs. Each mode adapter presents a SWG structure which progressively modifies its width between the width of a conventional monomode wire-waveguide and a greater width which serves as input to the MMI. Furthermore, the SWG mode adapter may comprise a central bridge with varying width, preferably starting at monomode wire-waveguide width and being progressively reduced until being nullified in the interface with the MMI slab. Notice that the term "wire-waveguide" is used in this document as opposed to "SWG waveguide", in the sense that the core is a continuous medium without cladding slabs.

Also notice, that the MUX of the invention is preferably implemented in Silicon on Insulator (SOI) in order to fully benefit from the high-index contrast of SOI, although particular embodiments of the invention may be implemented in other photonic platforms. That is, all waveguides of the device are preferably implemented with silicon as core material, deposited on an insulator layer, such as silica glass. The cladding material may vary between particular embodiments of the invention, with some non-limiting options including silica, polymer-claddings and air.

The outputs of the MMI are connected to at least one phase-shifter, where they undergo additional relative phase shifts. Finally, the phase-shifter outputs are connected to the output multimode waveguide by means of one or more symmetrical Y-junctions. For example, in the case of a two-mode multiplexer (a MUX with two inputs and one output), the SWG MMI is a 2×2 MMI. The inputs of the MMI are connected to the MUX input waveguides. The outputs of the MMI, between which a first phase shift of 90° is induced, are connected to a phase-shifter where a second phase shift of 90° is applied. As a result, when introducing a signal through the first input waveguide, the first and second phase shifts cancel each other and both outputs of the phase-shifter are in phase. After combination at the Y-junction, a zero-order mode is achieved. On the other hand, when introducing a signal through the second input waveguide, the first and second phase shifts add up to a total phase shift of 180° which, after combination at the Y-junction results in a first-order optical mode.

In the case of a three-mode MUX, a 4×4 MMI is preferably applied. The first input waveguide is connected to the first MMI input. The second input waveguide is split at a Y-junction, undergoes a phase shift (preferably 90°) and feeds the second and third MMI inputs. The third input waveguide is connected to the fourth MMI inputs. A 45° phase shift is then applied between the first and second MMI outputs and a 135° phase shift is applied between the third and fourth MMI outputs. The four resulting signals are then merged into the output multimode waveguide, preferably through cascaded Y-junctions, although a four-port Y-junction may alternatively be used.

Notice that alternative combinations of phase-shifters and Y-junctions may be implemented to achieve the desired phase relations. Also notice that this architecture can be scaled with a greater number of MMI ports and phase shifts to achieve a MUX with a higher number of multiplexed modes. Finally, notice that the implementation of MUX operating with more than two modes is synergically enabled by the high-performance of the MMI and phase-shifters in terms of excess losses, bandwidth and fabrication tolerances, as the response of conventional technologies would provide insufficient extinction ratio margins to combine more than two optical modes.

Furthermore, three preferred alternatives for the implementation of the phase-shifter (or phase-shifters) are disclosed, whose properties are synergically combined with the MMI performance to provide overall bandwidth enhancement, compact footprint, high extinction ratio and high tolerance to fabrication deviations:

A first phase-shifter topology comprising a first waveguide of constant width and a second waveguide with a section where width is progressively increased and then reduced again down to its original value.

A second phase-shifter topology comprising at least a SWG region, preferably with one or more SWG parameters engineered through photonic simulations to optimize bandwidth and/or fabrication tolerance. More preferably, the second phase-shifter topology comprises two SWG regions of different width, one on each waveguide. SWG mode adapters, similar to those at the inputs and outputs of the MMI may also be included.

A third phase-shifter topology comprising one or more lateral phase-loading segments. In preferred embodiments of the third phase-shifter topology, width modifications, mode adapters, SWG structures in the central waveguide and/or SWG structures in the phase-loading segments may be applied.

Finally, in another preferred option, the mode converter and multiplexer can also operate as a switch by using one or more controllable phase-shifters, which can be switched between at least a first phase shift value and a second phase shift value. For example, for the case of two modes multiplexing, it is dynamically chosen which of the two input zero-order modes is transformed into the output first-order mode, depending if the phase-shifter is configured to induce a 90° or a 270° phase shift.

The disclosed mode converter and multiplexer provides a very broad bandwidth, low losses and high extinction ratio in a compact device. These and other advantages will be apparent at the light of the

BRIEF DESCRIPTION OF THE DRAWINGS

For the purpose of aiding the understanding of the characteristics of the invention, according to a preferred practical embodiment thereof and in order to complement this description, the following figures are attached as an integral part thereof, having an illustrative and non-limiting character.

DETAILED DESCRIPTION OF THE INVENTION

Figure 1:
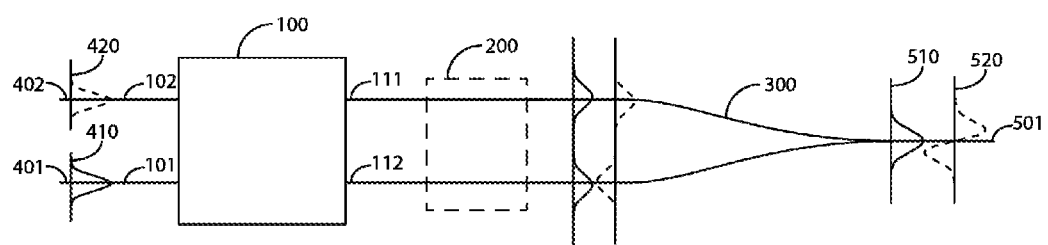
FIG. 1 schematically depicts the main elements of a two-mode multiplexer according to a preferred embodiment of the invention.

FIG. 1 shows a first preferred embodiment of the mode converter and multiplexer of the invention, for the particular case of two-mode conversion, that is, for the particular embodiment of a device which converts two zero-order input modes into a zero-order output mode and a first-order output mode. The device comprises a first monomode input waveguide (401) which receives a first zero-order mode (410) and a second monomode input waveguide (402) which receives a second zero-order mode (420). The first input waveguide (401) and second input waveguide (402) are connected to the first input (101) and second input (102) of a MMI (100). The MMI (100) equally splits both inputs into a first output (111) and a second output (112), inducing a first phase shift of 90° between said outputs. The first output (111) and second output (112) are connected to a first phase-shifter (200) which induces a second phase shift of 90° between its upper and lower arms. Both arms are then combined by a Y-junction (300), being the output of the Y-junction (300) an output multimode waveguide (501).

When light enters through the first input waveguide (401), the first phase shift and the second phase shift cancel each other out. Therefore, the optical modes exiting the first phase-shifter (200) are in phase and their combination result in a zero-order output mode (510). When light enters through the second input waveguide (402), the first phase shift and the second phase shift cancel add up to a total 180° phase shift. Therefore, the optical modes exiting the first phase-shifter (200) are in counter-phase and their combination result in a first-order output mode (520).

Figure 2:
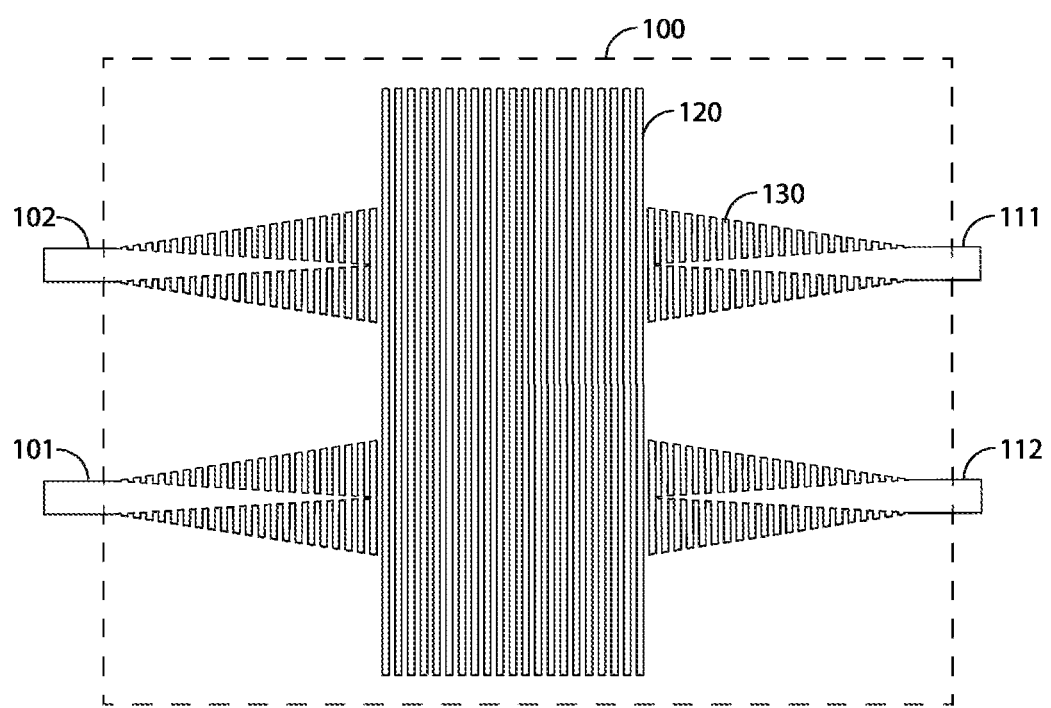
FIG. 2 shows in further detail a subwavelength multimode interference coupler, according to a preferred embodiment of the invention.

FIG. 2 shows the SWG MMI (100) in further detail, which is a common element to all embodiments of the invention. The MMI comprises a SWG slab (120), with alternating sections of core and cladding material. Rectangular-shaped sections of core material are laid transversally to the input and output waveguides. In order to optimize exciting conditions at the MMI (100), all inputs and outputs comprise SWG mode adapters (130), which progressively increase waveguide width and reduce effective index. The mode adapters (130) comprise a central bridge, that is, a small connector made of core material in the centre of the cladding sections. The central bridge width decreases as the total waveguide width increases, being fully removed at the interface with the MMI (100) slab. Notice that the particular mode adapter (130) geometry may vary between implementations, as long as a smooth mode transition is guaranteed.

Figure 3:
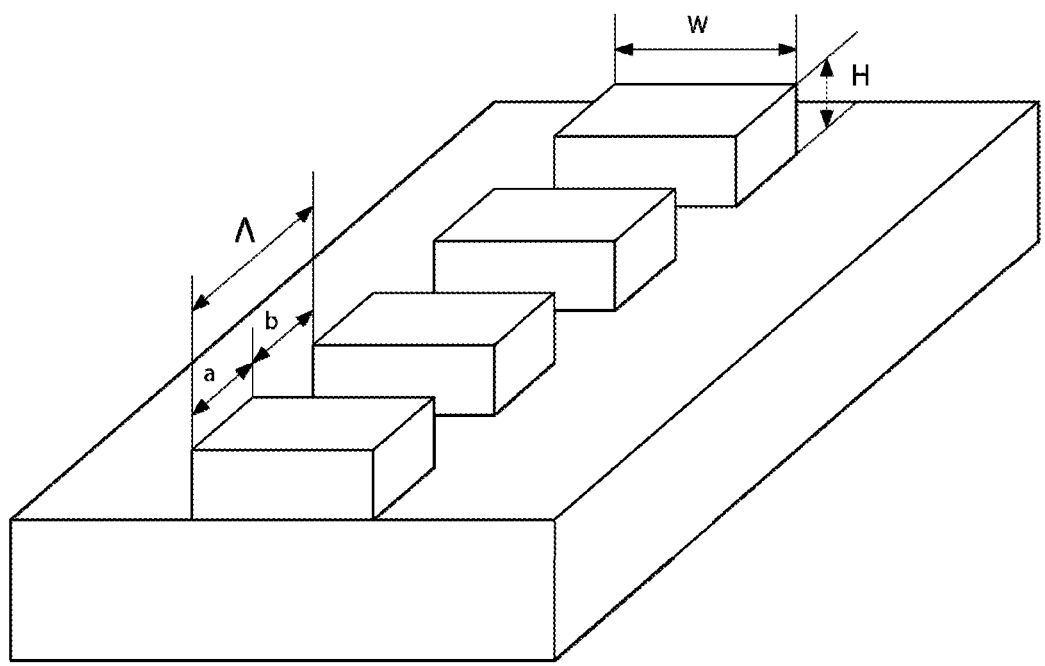
FIG. 3 illustrates the main parameters of a subwavelength-grating.

FIG. 3 shows in greater detail the main parameters of any SWG grating, which can be tuned through photonic simulations for refractive index and dispersion engineering. In particular, said SWG parameters include waveguide width (W), waveguide height (H), period (A), and fill factor (f). The fill factor, or duty cycle, is the relation between the lengths of the core section (a) and the cladding section (b) within a period (A). The period (A) is also referred to as pitch.

The length of the MMI (100) slab, $L_{CONV-MMI}$, is given by:

$$L_{CONV-MMI} = 3L_\pi/2$$

where $L_\pi$ is the beat length between the first and the second order modes with effective indexes $n_{eff}^0$ and $n_{eff}^1$ respectively:

$$L_\pi = \frac{\lambda}{2(n_{eff}^0(\lambda) - n_{eff}^1(\lambda))}$$

Conventional MMIs depends directly on the wavelength and, subsequently, self-images are formed at different lengths for every wavelength. Hence the bandwidth limitation of conventional MMIs, that restrict the performance of conventional mode MUX devices. Nevertheless, by engineering the dispersion of the guided modes in the multimode section of the MMI coupler an almost flat beat length can be achieved, so that the index difference $n_{eff}^0(\lambda) - n_{eff}^1(\lambda)$ remains almost constant with the wavelength. For example, the disclosed MUX can provide an extinction ratio over −20 dB in a broad range of over 300 nm (1400 nm-1700 nm), covering C, S and L communication bands.

The first step of the SWG MMI (100) design is to define a mode adapter (130) width at the interface with the MMI slab, $W_a$, that guarantees that only the fundamental modes are excited. This is performed by simulating and analyzing the curve of the real part of the effective index against said mode adapter width. In order to guarantee that modes are guided, their real part must be greater than the refractive index of cladding and substrate. However, width must be small enough as to avoid propagation of higher-order modes. The final width value can be arbitrarily chosen between those limits. The separation between mode adapter (130) at the interface with the slab, $W_{sep}$, is selected by guaranteeing a coupling of less than a predefined threshold, such as −40 dB. The total MMI (100) width, $W_{MMI}$ is then computed as $W_{MMI}=2(W_{sep}+W_a)$. The mode adapter (130) length is chosen to ensure smooth mode transformation.

Then, the SWG parameters are defined. A duty cycle of preferably 50% is preferably chosen in order to facilitate fabrication. That is, the lengths of the core section (a) and the cladding section (b) are the same. The pitch is chosen within a range with a lower limit defined by the minimum feature size characteristics of the fabrication technologies and an upper limit which avoids Bragg condition. Said upper limit, $\Lambda_{max}$, can be estimated as:

$$\Lambda_{max} = \frac{\lambda_{min}}{2n_{eq}}$$

where $\lambda_{min}$ is the shortest wavelength within the operation range of the MUX, and $n_{eq}$ is defined by Rytov formulation:

$$n_{eq} \approx \sqrt{DC \cdot n_{eq_{core}}^2(\lambda) + (1-DC) \cdot n_{substrate}^2(\lambda)}$$

where DC is the duty cycle, $n_{eq_{core}}$ is the core equivalent refractive index, A is the wavelength and $n_{substrate}$ is the substrate refractive index. Then, a plurality of pitch values within the aforementioned range are simulated, choosing the pitch value resulting in the widest bandwidth, and/or in the flattest response within a predefined wavelength range. Finally the MMI (100) length is optimized by further simulations, starting at the theoretical value defined by $L_{CONV-MMI}=3L_\pi/2$.

Figure 4:
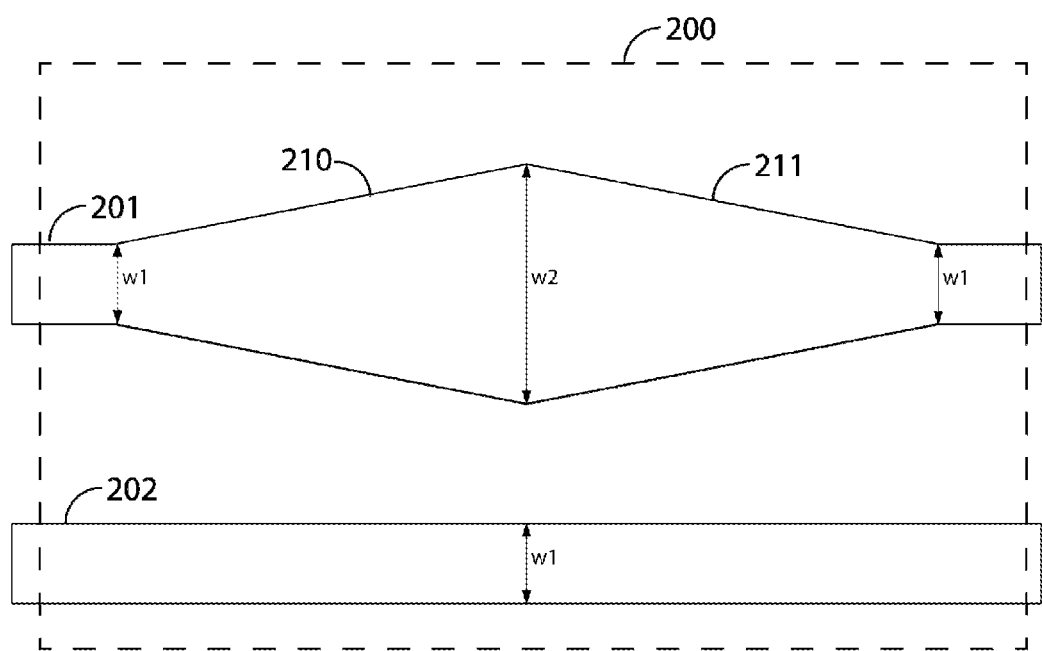
FIG. 4 presents a first preferred embodiment of the phase-shifter of the invention, based on a continuous waveguide with locally-increased width.

FIG. 4 presents a first embodiment of the phase-shifter (200), comprising a first waveguide (201) and a second waveguide (202). The second waveguide (202) is a conventional wire waveguide with a first width (w1) without any geometrical modifications, whereas the first waveguide starts with the first width (w1), but comprise two symmetrical trapezoidal regions (210, 211) which widen the waveguide up to a second width (w2) and then decrease back to the first width (w1). As a consequence, mode velocity is reduced and the desired phase shift is induced. Notice that alternative embodiments based on the same principle may be implemented, for example substituting the trapezoidal regions (210, 211) for other width profiles, such as curves; by adding a central region with constant second width (w2) between the trapezoidal regions (210, 211); by using a second width (w2) smaller than the first width (w1), and/or by any other combination of width variations resulting in the same total phase-shift.

In order to design the first embodiment of the phase-shifter, the second width (w2) can be selected arbitrarily, and then the optimal length of the trapezoidal regions (210, 211) is computed to obtain the desired phase shift. However, it should be taken into a account that the minimum length of the combined trapezoidal regions ($L_{psmin}$) in order to ensure adiabatic transitions is:

$$L_{psmin}=(w2-w1)/\tan(\alpha_{min})$$

where $\alpha_{min}$ is preferably 5°. Notice that, preferably, several second width (w2) values can be simulated, each one applying a range of simulated fabrication deviations from the ideal design, enabling to choose the second width (w2) value which provides the most resilience to this effect.

Figure 5:
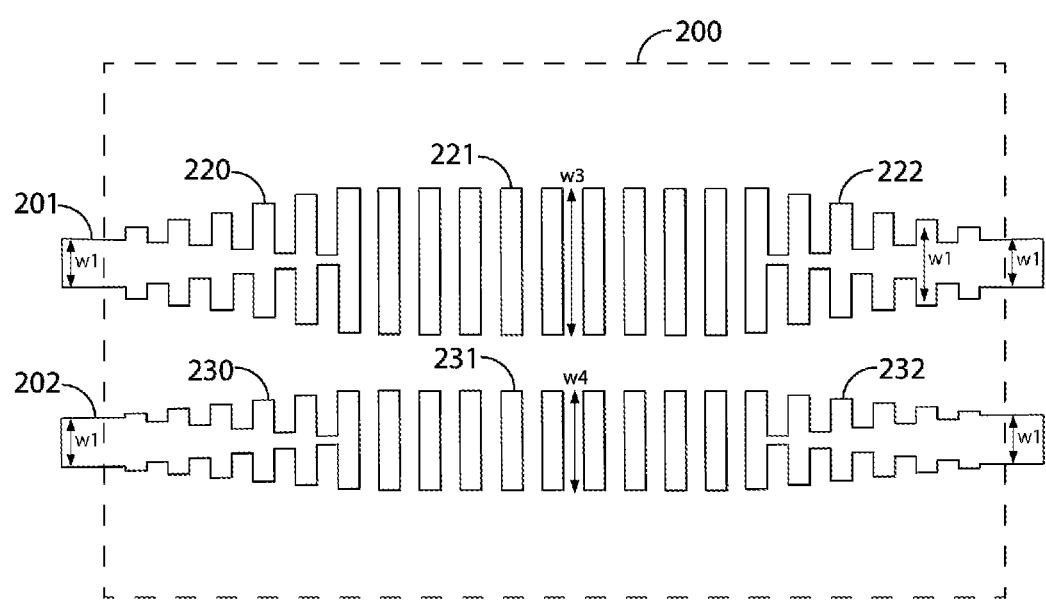
FIG. 5 presents a second preferred embodiment of the phase-shifter of the invention, based on a subwavelength waveguide.

FIG. 5 presents a second embodiment of the phase-shifter (200), also comprising a first waveguide (201) and a second waveguide (202). The first waveguide comprises a first SWG delay (221) with a third width (w3), with a first width adapter (220) and a second width adapter (222) at both sides. The second waveguide comprises a second SWG delay (231) with a fourth width (w4), with a first width adapter (230) and a second width adapter (232) at both sides. The difference between the third width (w3) and the fourth width (w4) results in the desired phase-shift, while obtaining a flatter wavelength-response than in the first embodiment of the phase-shifter (200). Furthermore, by optimizing the SWG parameters of the second embodiment of the phase-shifter (200) through photonic simulations, a synergic response with the MMI (100) increased bandwidth is obtained. In the aforementioned example, a final extinction ratio improvement of −10 dB along the 300 nm wavelength range can be obtained.

Notice that alternative embodiments of the phase-shifter (200) relying in SWG may be implemented, as long as the first waveguide (201) and the second waveguide (202) present different parameters. For example, instead of varying SWG width (W), the period (A) or fill factor (f) may be modified. Also notice that the particular geometry of the width adapters (220, 222, 230, 232) may vary between implementations, as long as a smooth mode transition is guaranteed. Furthermore, particular embodiments of the phase-shifter (200) may comprise SWG regions in only one of the waveguides, although it is recommended to include SWG regions in both for optimal response flatness.

Figure 6:
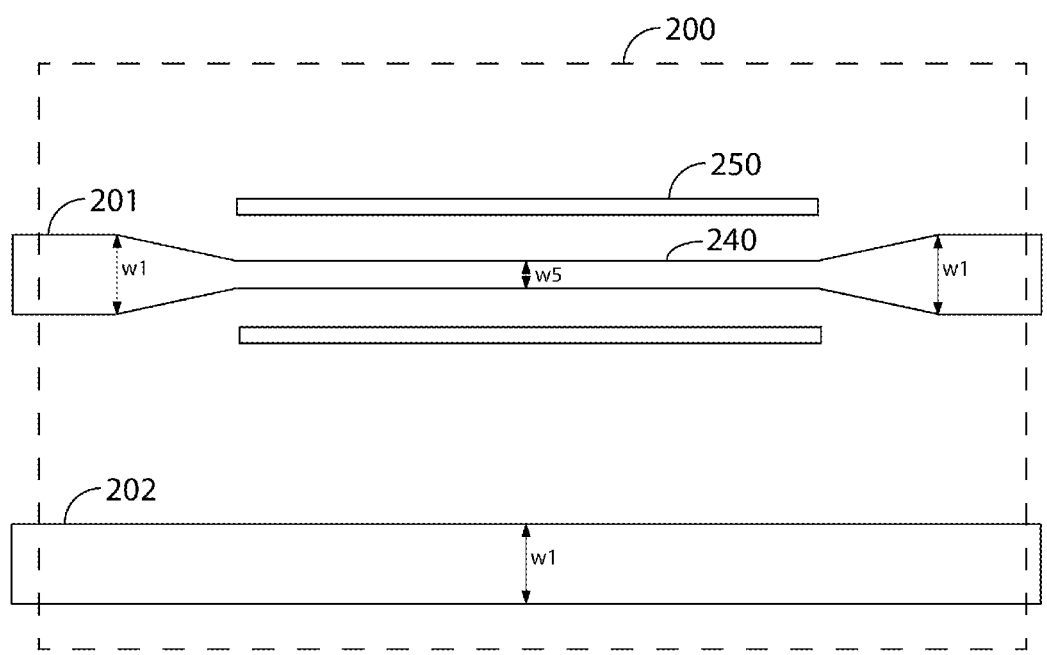
FIG. 6 presents a third preferred embodiment of the phase-shifter of the invention, based on lateral phase-loading segments.

FIG. 6, presents a third embodiment of the phase-shifter of the invention, relying on one or more phase-loading segments (250) at the sides of the first waveguide (201). Said first waveguide (201) preferably presents a reduced width (w5) in the region (240) where the phase-loading segments (250) are located to delocalize the optical mode and enhance the effect of said segments. Width reduction is preferably performed progressively through mode adapters. Furthermore, the phase loading segments (250) may comprise additional geometrical features on their extremes to obtain a smoother effective index transition, such as angled, curved or thinned extremes.

Similar width reductions as in the first waveguide (201) may be also implemented in the second waveguide (202), down to the same reduced width (w5) or to a different width, to optimize bandwidth. Furthermore, said second waveguide (202) may also comprise phase-loading segments (250), as long as they present different geometrical properties. Also, the phase loading segments and/or the central waveguides may comprise SWG regions for dispersion engineering. This third phase-shifter (200) embodiment has the particular advantage of being unaffected by fabrication deviations in a broader range, when its geometrical parameters are optimized through photonics simulation.

Figure 7:
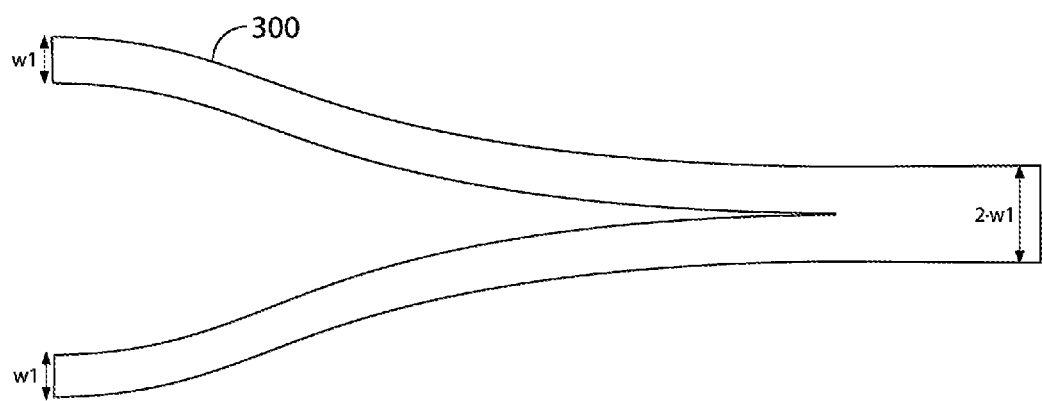
FIG. 7 shows in further detail a symmetrical Y-junction, according to a preferred embodiment of the invention.

FIG. 7 shows a preferred embodiment of the symmetrical Y-junction (300) in further detail. The Y-junction (300) comprise two monomode inputs that feed two arms with sinusoidal profiles. The two arms finally merge into a multimode output, typically with double the width of the inputs, although the particular geometrical design may vary between implementations. The Y-junction (300) is preferably designed by optimizing its length through photonic simulations, based on a fixed value of the separation between arms, given by the separation between the outputs of the MMI (100) and/or the phase-shifter (200). The length optimization requires a compromise between device size and return losses.

Figure 8:
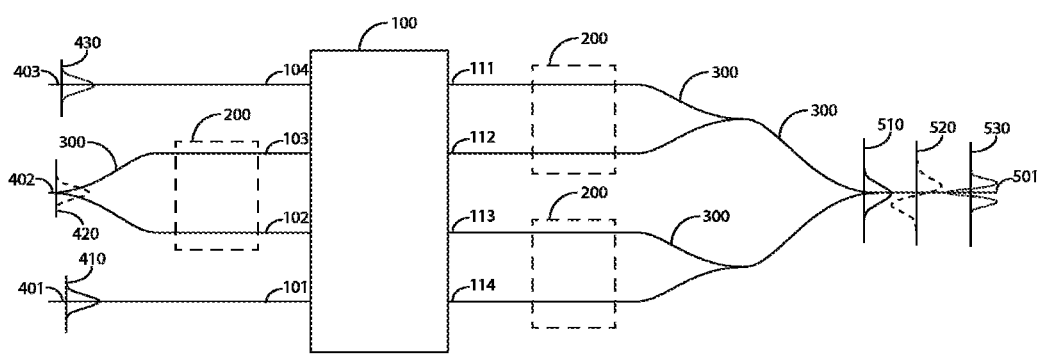
FIG. 8 schematically depicts the main elements of a three-mode multiplexer according to a preferred embodiment of the invention.

Finally, FIG. 8 presents a preferred embodiment for multiplexing (or demultiplexing) three optical modes in the same devices. A third input waveguide (403) which receives a third zero-order mode (430) is included. The MMI comprises a third input (103), a fourth input (104), a third output (113) and a fourth output (114). The second input (102) and third input (103) are both fed by the second monomode input waveguide (402) through an additional Y-junction (300), whereas the fourth input (104) is fed by the third monomode input waveguide (403). In order to induce the necessary phase shifts to generate the zero-order output mode (510), the first-order output mode (520), and a second-order output mode (530), the device comprises three phase-shifters (200):

A 90° phase-shifter (200) between the second input (102) and third input (103).

A 135° phase-shifter (200) between the first output (113) and second output (114).

A 45° phase-shifter (200) between the third output (113) and fourth output (114).

Notice that the invention, according to any of the disclosed embodiments can also operate as a switch by simply using one or more controllable phase-shifters (200) instead of a passive phase-shifter (200). That is, instead of a phase-shifter (200) which induces a fixed phase shift, the induced phase shift is externally controlled, therefore enabling simultaneous switching of two optical modes. The control of the phase-shifter (200) may be implemented with any technology known in the state of the art, such as a PN junction with free-carrier injection/depletion.

The invention claimed is:

1. A phase-shifter comprising a first waveguide and a second waveguide, the first waveguide varying between a first width and a second width, characterized in that the phase-shifter further comprises an arrangement of periodically alternated sections of the core material and of the cladding material, with a period smaller than a value of the shortest wavelength in the bandwidth of the phase shifter; and the phase-shifter further comprises at least one phase-loading waveguide segment located at a side of the first waveguide.

2. The phase-shifter according to claim 1, characterized in that the phase-shifter further comprises a plurality of mode adapters varying waveguide width while periodically alternating sections of a core material and of a cladding material.

3. The phase-shifter according to claim 1, characterized in that each of the first waveguide and the second waveguide comprises an arrangement of periodically alternated sections of the core material and of the cladding material, with a period smaller than a value of the shortest wavelength in the bandwidth of the phase shifter, and the first waveguide and the second waveguide having different widths.

4. The phase-shifter, according to claim 1, characterized in that the at least one phase-loading waveguide segment comprises a region with periodically alternating sections of the core material and of the cladding material.

5. An integrated mode converter and multiplexer, comprising:

at least a first monomode input waveguide adapted to receive a first input zero-order signal and a second monomode input waveguide adapted to receive a second zero-order signal;

a multimode output waveguide adapted to transmit at least a first zero-order output signal and a second first-order output signal; and a multimode interference coupler configured to equally split optical signals from a first input and a second input into a first output and a second output, and to induce a first phase shift of 90° between the first output and second output;

a first phase-shifter associated with the first output and second output, configured to induce a second phase shift between the first output and second output, the first phase-shifter comprising a first waveguide and a second waveguide, the first waveguide varying between a first width and a second width, and the first phase-shifter further comprising an arrangement of periodically alternated sections of the core material and of the cladding material, with a period smaller than a value of the shortest wavelength in the bandwidth of the first phase-shifter;

one symmetrical Y-junction arranged next to the first phase-shifter, configured to combine outputs of the first phase-shifter into the multimode output waveguide;

one region in the multimode interference coupler comprising an arrangement of periodically alternated sections of a core material and of a cladding material, with a period smaller than a value of the shortest wavelength in the bandwidth of the mode converter and multiplexer; and a plurality of mode adapters connected to the first input, second input, first output and second output, each mode adapter comprising a progressively varying waveguide width while periodically alternating sections of the core material and of the cladding material.

6. The integrated mode converter and multiplexer, according to claim 5, characterized in that:

the first monomode input waveguide is connected to the first input of the multimode interference coupler, the second monomode input waveguide is connected to the second input of the multimode interference coupler, and the second phase shift is 90°.

7. The integrated mode converter and multiplexer according to claim 5, wherein the multimode output waveguide is adapted to further transmit a third output second-order signal; the integrated mode converter and multiplexer further comprising a third monomode input waveguide adapted to receive a third input zero-order signal; the integrated mode converter and multiplexer being characterized in that the multimode interference coupler further comprises a third input, a fourth input, a third output and a fourth output; wherein the integrated mode converter and multiplexer further comprises:

a symmetrical Y-junction connecting the second monomode input waveguide to the second input and third input;

a second phase-shifter configured to induce a third phase shift between the third output and fourth output; and a third phase-shifter configured to induce a fourth phase shift between the second input and third input.

8. The integrated mode converter and multiplexer according to claim 7 characterized in that the second phase shift is 45°, the third phase shift is 135° and the fourth phase shift is 90°.

9. The integrated mode converter and multiplexer according to claim 5, characterized in that the at least one phase-shifter is a controllable phase-shifter, externally switched between a first phase shift value and a second phase shift value.

* * * * *